DEVICE FOR FASTENING A REEL TO A SHAFT

Filed April 4, 1966

INVENTORS:
ROBERT M. MESSAMER
PHILIP S. BRYER
By Smyth, Roston & Pavitt
ATTORNEYS United States Patent Office 3,366,343
Patented Jan. 30, 1968

3,366,343
DEVICE FOR FASTENING A REEL TO A SHAFT

Robert M. Messamer, Pacoima, and Philip S. Bryer, Los Angeles, Calif., assignors to Scientific Data Systems, Inc., Santa Monica, Calif., a corporation of Delaware Filed Apr. 4, 1966, Ser. No. 539,848
14 Claims. (Cl. 242—68.3)

ABSTRACT OF THE DISCLOSURE

A radially expandable hub is axially movably mounted to a shaft. The radial expansion of the hub is controlled from the axial position thereof. A reel when slid onto the hub causes the hub to move axially. The resulting radial expansion of the hub clamps the reel, and by over-center locking the reel and hub are radially and axially position-locked to the shaft.

The present invention relates to a device for fastening and locking a reel to a shaft. Reel locking devices as they are commonly known and used usually comprise a hub mounted on a driven shaft for rotation therewith. A reel such as a magnetic tape reel will be connected to the hub in that the reel is first slid upon the hub and subsequently the operator has to actuate some kind of locking device which secures the reel to the hub. Such a device is subject to human error; for example, the operator may forget to actuate the locking device for fastening the reel, or he does not tighten it enough. Either case may have catastrophic results as the reel may be thrown off the shaft.

It is the principal object of the present invention to provide a reel locking device in which the sliding motion with which the operator places the reel onto the hub is translated directly into a locking motion so that as the operator puts the reel into its proper place on the hub, the reel is thereby also locked to the shaft and the hub.

In accordance with the present invention it is suggested to employ a hub member which is basically capable of assuming two different axial positions relative to the shaft. The hub member is so constructed that the effective periphery is larger in one of these two axial positions than in the respective other one. As the operator slides the reel onto this hub, he does so when the hub is in the axial position offering a smaller diameter, so that the reel, particularly the central aperture of the reel, can be slid onto the hub rather easily. The sliding motion however is not completed until the reel with hub member is placed into the second position of the hub member, whereby in the transition from this first to the second position the effective diameter of the hub is enlarged, in that portions of the hub are spread radially, to thereby clamp the hub to the reel. For removal of the reel the motion is simply reversed in that at first the operator pulls reel with hub from the second position back to the first position whereby the effective diameter of the hub is reduced and upon continuing the motion in the same direction, the operator can then slide the reel off the hub at reduced hub diameter.

The hub is constructed to have basically two major parts. One of these parts is secured to the shaft rotating therewith and it is not capable of relative axial movement. The other hub member is mounted on the first one but can move axially to a limited extent relative to the shaft. This second hub member includes several control shoes capable of moving radially outwardly, and they are linked to the first hub member, so that their radial outward or inward motion is controlled in strict dependence upon the relative axial postiion the second hub member has in relation to the first hub member. The reel is slid on this second hub member in a position wherein the control shoes are at least partially retracted. The second hub member, in addition, has a stopping means such as a flange. As the reel abuts the flange further motion of the reel in axial direction requires that the second hub member is being carried along, and thereby the control shoes are moved in outward direction to clamp the reel.

It should be mentioned that this device permits locking of the reel to the shaft in a random index relationship, but additional indexing means may be provided, if necessary, in order to ensure a particular phase relationship between the reel and the shaft such as required. However, indexing is not necessary for properly securing the shaft to the reel.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

Figures 1, 2, 3, 4, 5:
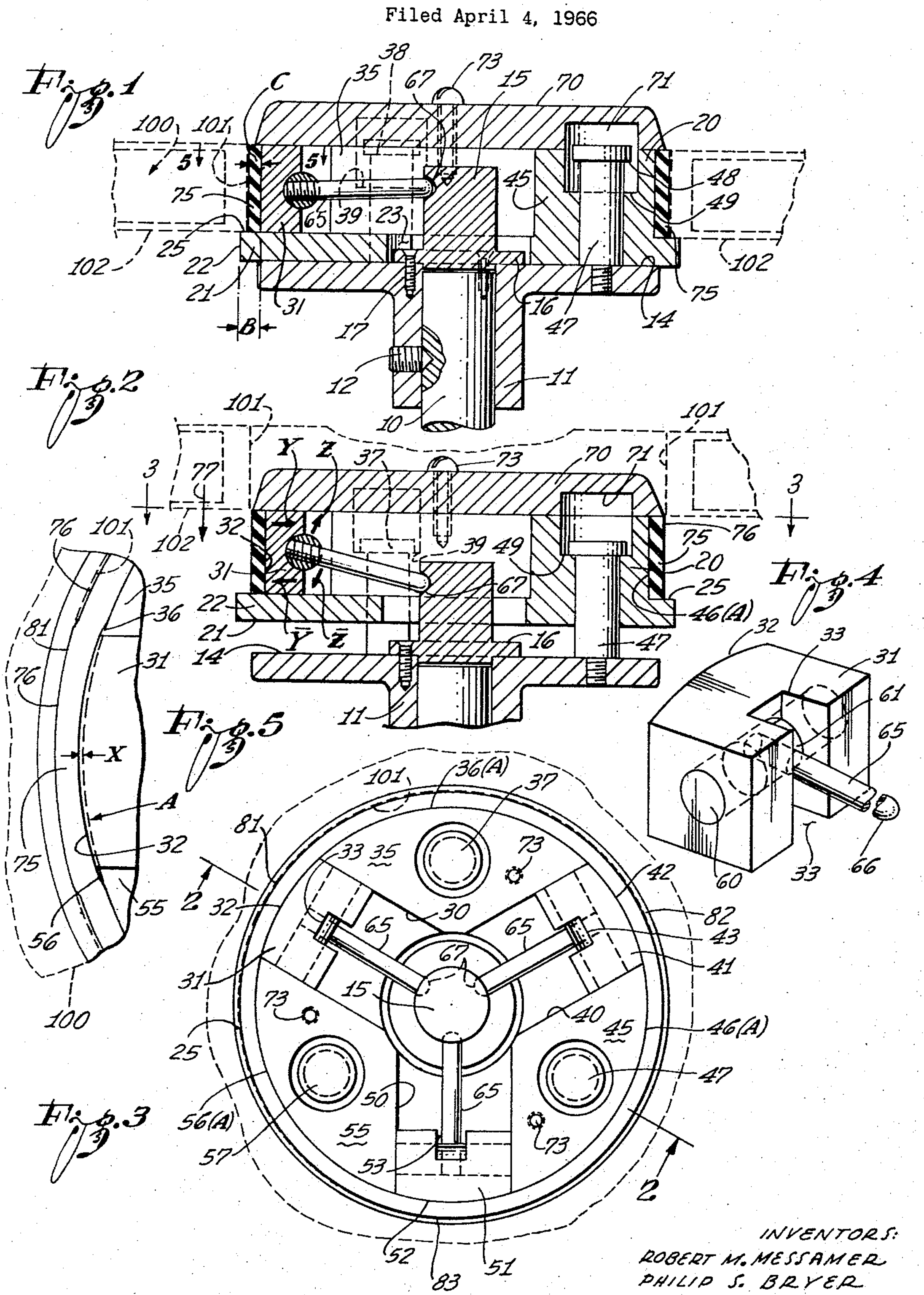
FIGURE 1 illustrates a cross-sectional view through the hub structure with a reel seated on the hub in locking position.
FIGURE 2 illustrates a section view on line 2—2 in FIGURE 3 representing the alternative position of the hub member with the reel removed.
FIGURE 3 illustrates a view of the plane identified by the lines 3—3 in FIGURE 2.
FIGURE 4 illustrates in perspective view a control shoe which in accordance with the invention translates axial movement of the hub into a radial spreading motion to change the effective diameter of the hub.
FIGURE 5 illustrates a view taken in the plane identified by line 5—5 in FIGURE 1 of an enlarged portion of the peripheral section of the hub structure shown in FIGURE 1.

Proceeding now to the detailed description of the drawings, there is shown a shaft 10 to which is secured a turntable 11 by means of screws or bolts 12. The turntable 11 has a central aperture to receive the end of the shaft 10. The end face of the shaft 10 is positioned somewhat below the plane of the outwardly axially extending surface 14 of turntable 11. The turntable 11 serves as support for the inventive hub structure.

A control post 15 is centrally secured to the turntable 11, and the post 15 is provided with a flange 16 which is fastened to the turntable 11 by means of screws 17. Thus, the elements 11 through 17 form a uniform structure which is positively connected to the shaft 10, permitting neither axial nor relative radial movement in relation to the shaft 10. It should be mentioned that these elements basically could be made as an integral unit, but for facilitating manufacturing, it is preferred to provide these parts individually and to assemble them as described.

A guide member 20 is provided with an annulus 22 positioned in a manner which permits face-to-face engagement of the lower surface 21 of the annulus or disk 22 with the outwardly directed face 14 of turntable 11. With no reel attached, this member 20, and particularly annulus 22 thereof is disengaged from the turntable 11 and has the position as illustrated in FIGURE 2. Here it should be mentioned that in most instances the shaft 10 will extend in horizontal direction so that gravity does not urge the member 20 into contact or engagement with the turntable 11. However, even in the case of a vertical shaft, there are provided means, to be explained more fully below, to prevent the normal engagement of the two surfaces 14 and 21.

The member 20 has several portions to be explained in the following. First of all, the member 20 can be regarded as a cylindrical block which is provided with three radially extending channels 30, 40 and 50. The bottom of these channels is formed by upper surface portions of annular disk 22, the surface 21 being the respective opposite or lower surface of disk 22. Disk 22 projects radially from member 20 leaving a shoulder 25 which is coplanar with surface 21. Disk 22 has a central aperture 23 which receives the flange 16. However, the periphery of the aperture 23 clears the peripheral rim of the flange 16, so that the disk 22 can move axially relative to the flange 16.

The channels 30, 40 and 50 leave three somewhat pie shaped blocks 35, 45 and 55 having concentric, radially outwardly directed cylindrical peripheral surfaces 36, 46 and 56. The radial dimensions of these surfaces 36, 46 and 56 are smaller than the radius of the disk 22, to provide an annular shoulder 25 as axially directed, radial extension of the bottoms of channels 30, 40 and 50.

This cylinder considered as a geometrical configuration and as defined by surfaces 36, 46 and 56 will in the following be designated as hub cylinder A.

The three channels 30, 40 and 50 respectively receive control shoes or pistons 31, 41 and 51 respectively. These control shoes have radially directed, curved, peripheral surfaces respectively denoted by reference numerals 32, 42 and 52. The radius which defines each of these surfaces is the same for all of them, and this radius is similar to the radius defining cylinder A. Thus the peripheral surfaces 36, 46 and 56 may together with the surfaces 32, 42 and 52 define a contiguous cylinder, provided the control shoes are in the position illustrated in FIGURE 3 which corresponds to the position shown in FIGURE 2.

The control shoes or pistons 31, 41 and 51 are movably positioned in their respective channels 30, 40, 50. These control shoes may move in radial direction only so that they can project beyond the above defined peripheral hub cylinder A. Arrow Y denotes the radial inward direction, and arrow Y the complementary radial outward direction. Each of the control shoes or pistons has an axially oriented channel such as 33, 43 and 53, and each control shoe has a tubular bore extending transversely to its respective channel. Thus, the shoes or pistons are similar, and the details of their structure needs to be described only with reference to one particular shoe, which is illustrated in FIGURE 4.

FIGURE 4 illustrates piston 31, and its cylindrical bore receives a bolt 60. The bolt 60 traverses and passes through a portion of the channel 33 and is thus exposed in an area denoted with reference numeral 61. The bolt 60 has a radially oriented bore (radial with respect to its own cylindrical configuration), which bore is located in the region of the thus exposed peripheral mantle portion 61. This bore in bolt 60 is threaded, and it threadedly receives one end of a control rod 65. This control rod 65 is thus permitted to pivot about the axis of the bolt 60, with the bolt 60 being journalled in shoe 31. It is the purpose of the channel 33 of shoe 31 to permit pivoting of the rod 65 through a large angular range which may be limited otherwise.

The other end 66 of the control rod 65 is hemispherically shaped, and upon positioning the shoe in the channel the rounded end 66 of rod 65 is received in a pocket in control post 15, such as pockets 67, facing radially outwardly. The engagement of this hemisphere 66 with the wall of a pocket 67 establishes another pivot point for the control rod 65, and it is a pivot point bearing a fixed relation to the axis of the shaft 10. The shoe or piston 31 is positioned in the channel 30, and its control rod 65 bears against its pocket 67; it is thus apparent that upon axial movement of the member 20 and disk 22, the shoe 31 will follow this axial movement. Pursuant to this axial movement, the piston rod 65 pivots about a pivot point in pocket 67 because the pocket does not follow the axial movement. Hence, this axial movement of member 20 is translated into a radial movement of shoe 31. The same holds true for shoes 41 and 51.

When the control rods 65 have a position which is precisely perpendicular to the axis of shaft 10, or, in other words, if the center axis of each of the control rods 65 runs parallel to the surface 14 of turntable 11, the pistons 31, 41 and 51 each are in their radially outermost position, i.e., a position in which their peripheral surfaces 32, 42 and 52 are the farthest out in radial direction as measured from the center or axis of the shaft 10. It will be appreciated, that in such a position the control shoes project beyond the above defined hub cylinder A at maximum distance permissible.

When the control rods 65 extend at an angle upward or downward, measured relative to a radially oriented plane, the shoes or pistons are more or less retracted from their outermost position, and it can be seen that it is possible to dimension the device, so that the shoes can be retracted to an extent at which the hub cylinder A extends farther out radially than the peripheral surfaces 32, 42 and 52 of the shoes if so retracted. The extent of permissible retraction is determined by the range of permitted axial movement of the member 20, as this determines the angular range of pivoting of rods 65. This range will be discussed more fully below.

In the position shown in FIGURE 1, the disk 22 is directly seated on the turntable 11 for engagement with the surface 14 thereof. The piston rods 65 have an angle slightly downwardly inclined as measured from a plane transversely to the axis of rotation of shaft 10 and traversing the pivot area in pockets 67. In this case the shoes 31, 41 and 51 are slightly retracted from their respective outermost position. However, and this is a salient point of the invention, in this position the shoes still project beyond the peripheral hub cylinder A for the distance X as is shown in FIGURE 5.

Three guide bolts 37, 47 and 57 are screwed into the turntable 11 and extend in radial direction away from the plane 14. The bolts have heads which respectively define shoulders such as 38 and 48. (The shoulder of bolt 57 is not illustrated, but is, of course, similar to the others.) The bolts respectively traverse apertures in the blocks 35, 45 and 55, which apertures are not of uniform diameter but define shoulders such as the shoulder 39 in block 35 or the shoulder 49 in block 45. (There is a similar shoulder in block 55.)

The bolts serve as a retaining means to limit the extent of the axial movement of member 20, and to particularly prevent the axial removal of the member 20 from the assembly. Thus, the position shown in FIGURE 2 in which, for example, the shoulders 48 and 49, and 38 and 39 engage each other is one of the two axial terminal positions of the member 20 in relation to the turntable 11; the other terminal position, of course, is the one in which the disk 22 of member 20 rests on the turntable 11 whereby the surfaces 14 and 21 engage each other. These two axial terminal positions define the angular range for rods 65 and thus the limits of radial movement of shoes 31, 41 and 51.

A cover plate 70 with three receiving cavities such as 71 is screwed onto the upper surface of member 20 by means of screws 73. Member 20 offers here the upper surface of the three blocks 35, 45 and 55 for attachment. This cover plate 70 extends over the channels 30, 40 and 50 to retain the shoes 31, 41 and 51 respectively therein.

The hub cylinder A as defined by the peripheral surfaces 36, 46 and 56 is now enveloped by a resilient ring 75, which for positioning may have to be stretched so as to provide radially inwardly directed bias. The ring 75 is preferably made of rubber. The ring 75 may further be provided with axially oriented corrugations.

It can be seen now that in case the resilient bias of the ring 75 is sufficiently strong, it can serve to retain the shoes 31, 41 and 51 in the position in which their respective peripheral surfaces 32, 42 and 52 are flush with the hub cylinder A as defined by the surfaces 36, 46 and 56. This is a position in which the control rods 65 are upwardly inclined as illustrated in FIGURE 2. The resilient force thereby exerted upon the shoes may suffice to retain normally the member 20 in the position illustrated in FIGURE 2 even in case the shaft extends in vertical direction. The resilient ring 75 tends to urge the shoes in the direction of arrow Y, so that rods 65 are pivotally biased in the direction Z, opposite to the forces of gravity that tend to pull member 20 down, and this, in turn, puts the shoulders of the bolts such as shoulders 38 and 48 of bolts 37 and 47 respectively into engaging position with the shoulders 39 and 49 respectively. There is, of course, a corresponding retaining operation by the bolt 57 but this is not visible in the figures.

The rubber ring 75 has an outer peripheral cylindrical surface 76 which defines the hub periphery proper. It should be mentioned that the ring 75 is sufficiently thin so as to leave some of the shoulder space of shoulder 25 of disk 22 exposed in axial direction. In other words the outer radius of disk 22 minus the radius of cylinder A (distance B) is still larger than the thickness C of rubber ring 75.

Having thus described the structural details of the inventive hub structure, we will proceed now to the description of the operation thereof. In the normal position, with no reel being placed onto the hub member 20, the hub member 20 has the position illustrated in FIGURE 2. Herein the surfaces 14 and 21 are apart from each other by the maximum permissible distance. The shoes or pistons 31, 41 and 51 are retracted, at least to a position in which their peripheral surfaces are flush with the hub cylinder A as defined by the surfaces 36, 46 and 56. Therefore, the rubber ring 75 has an annular symmetrical configuration with the peripheral surface 76 of ring 75 also forming a perfect cylinder.

It shall now be assumed that a reel such as reel 100 is to be locked to the shaft. Here it is presumed further that the reel 100 has a central cylindrical aperture as defined by a cylindrical wall 101. The diameter of cylinder 101 slightly exceeds the outer diameter of the cylinder defined by the surface 76 of ring 75, when in the position illustrated in FIGURE 2. However, the cylindrical wall 101 of this aperture has a diameter which is smaller than the outer diameter of disk 22.

To lock the reel 100 into position the operator will first slide the reel 100 over the rubber ring 75, and there may be a slight frictional engagement which is unimportant, but it should be possible to perform this sliding operation with ease. Hence, the rules for dimensioning of the reel, the ring 75 and the disk 22 as given above are only limits. This is of some importance, as it is thus permissible that the reels such as reel 100 do not have to be manufactured very accurately.

Member 20 will not change its position until the front face 102 of reel 100 engages the shoulder 25 of disk 22. As the operator holding the reel continues the axial motion in the direction of arrow 77, he will thereby carry along the member 20 in this direction, so as to move the surface 21 towards the surface 14 of turntable 11.

Since the control post 15 is an actuator which is immovable in axial direction, and since the cover plate 70 prevents axial displacement of the shoes 31, 41 and 51, the control rods 65 will pivot in their respective pockets 67 and in the direction $\overline{Z}$. Upon so pivoting the rods 65 will tend to reduce the angle between their respective axes and the plane of the turntable which is also, of course, a plane of rotation of the shaft. The pivot motion of rods 65 is transmitted upon the control shoes 31, 41 and 51 in that they now move radially outwardly, in the direction $\overline{Y}$, so that their peripheral surfaces 32, 42 and 52 are respectively protracted beyond the hub cylinder A as defined by surfaces 36, 46 and 56.

Naturally the resilient force of the ring 75 opposes this movement of the shoes 31, 41 and 51 so that the resilient bias of the ring 75 is increased; i.e., the rubber ring 75 is stretched. As the peripheral surface 76 of the ring 75 is urged against the inner cylindrical surface 101 of the aperture of reel 100 at the areas 81, 82 and 83, ring 75 is compressed additionally. The radially directed clamping force thereby exerted on the reel 100 is at its maximum when the control rods 65 are coplanar to each other and in a plane of rotation of shaft 10. However, in this position the surfaces 14 and 21 are still not in engagement so that the axial movement in direction 77 continues resulting in a slight receding of the shoes from their outermost radial position, and this, in turn, relaxes somewhat the resilient reaction of ring 75.

This over center movement of the hub will occur as snap action, because the resiliency of the ring 75 will tend to cause the shoes to retract, thereby causing control rods 65 to continue to pivot in direction $\overline{Z}$. From the position of maximum stretching of ring 75, snap action is possible in either direction Z or $\overline{Z}$, but the operator continues to move the reel with member 20 in the direction of arrow 77, so that the over center snap action naturally occurs in the same direction ($\overline{Z}$) and is terminated when the surfaces 21 and 14 engage each other (FIGURE 1).

It can now be seen that in this position as is shown in FIGURE 1, the shoes 31, 41 and 51 must still be in a somewhat projecting position (FIGURE 5), so that the ring 75 continues to resiliently clamp the reel 100 at the areas 81, 82 and 83. Thus, in the terminal position of hub member 20 reel 100 is locked to shaft 10 in that axial movement is impeded due to the fact that the rods are now slightly over center. The ring 75 as stretched and compressed continues to urge the shoes in radial direction and inwardly (arrow Y), and this is translated by the rods 65 into a retaining force in direction $\overline{Z}$ to maintain member 20 locked to turntable 11, thereby locking reel 100 to shaft 10. Upon rotation of shaft 10 the control shoes 31, 41 and 51 will be subjected to centrifugal force, but if the rigidity of reel 100 is sufficiently high, and if the compressibility of rubber ring 75 is sufficiently low, the shoes will not move sufficiently far out to escape from the locking position.

For removal of the reel 100 the operator simply has to grip reel 100 and pull it in the direction opposite to the direction of arrow 77. At first, the member 20 will follow this movement reluctantly and this axial movement is translated into an increase of clamping. After having passed through the centering position in which the control rods 65 are coplanar, the removal is now supported by the contraction of the ring 75 which tends to push the shoes radially inwardly (arrow Y). The movement in direction Y is translated by the member 20 into an axial movement in the direction opposite to arrow 77. Of course, member 20 can follow this axial movement only until the shoulders of the retaining bolts engage the shoulders such as 39 and 49 in member 20. At about that time, the ring 75 has again assumed the diameter in which no clamping force is exerted any more upon rim 101, and the reel 100 can now freely be removed from the hub.

It can thus be seen that by a simple axial sliding motion the hub is first moved axially for a limited distance, and this axial motion of the hub is translated into a radial hub-spreading motion clamping the hub to the reel. The over center position locks the reel axially. It can be seen further that from the standpoint of statics, the intermediate position of member 20 with maximum protraction of the control shoes is an astable position, and the resilient reaction of the ring 75 as translated by the pivoting control rods 65 tends to move member 20 either into the position shown in FIGURE 1 or into the position shown in FIGURE 2. This is principally independent from the presence of the reel; although the compression of the ring when urged against the reel causes additional resilient reaction for locking. The operator by means of the reel controls now the direction of the escape of member 20 from the astable position. In one case (locking) the engagement with rim 25 and the movement in direction of arrow 77 urges the member 20 into the locking position (FIGURE 1), because the movement in direction of arrow 77 will result in a pivoting of rods 65 in direction $\overline{Z}$. Upon pulling the reel in the direction opposite to arrow 77 this pulling is effective at the instant of maximum clamping which constitutes the astable position; thus the member 20 as clamped to reel 100 will follow this motion and rods 65 thus escape from the astable position by pivoting in direction Z to snap into the position of unlocking as illustrated in FIGURE 2.

The invention is not limited to the embodiment described above, but all changes and modifications thereof not constituting departures from the spirit and scope of the invention are intended to be covered by the following claims.

What is claimed is:

1. In combination for fastening a reel, a rotatable shaft, mounting means on the shaft for receiving the reel and for rotating with the shaft, and for movement in a first direction upon the receipt of the reel by the mounting means, and for movement in a second direction transverse to the first direction upon movement in the first direction;

means for limiting the movement of the mounting means in said first direction, the reel when removed from the mounting means being moved opposite to said first direction; and means mounted on the shaft and responsive to the movement of the mounting means in the second direction for coupling the reel to the mounting means for rotating therewith and the shaft, and for urging the mounting means towards the limiting means in said first direction for locking reel and mounting means to the shaft, the mounting means releasing the reel when the reel is urged opposite to the first direction.

2. In combination for fastening a reel to a rotatable shaft, comprising:

an actuator means on the shaft having a fixed relative position to the shaft;

a hub member on said actuator means having first and second axial positions to said shaft, and being coupled to the actuator means to assume different first and second radial dimension in said first and said second axial positions respectively; and means on the hub member for engagement with the reel so that upon axial movement of the reel the hub member moves from the first axial position to the second axial position or vice versa, the reel interacting with the hub member for clamping the reel to the hub member and releasably locking the hub member into the second axial position, the hub member releasing the reel after the hub has been forced by movement of the reel to follow axial motion of the reel, whereby the hub member moves from the second position to the first position of the hub member.

3. In combination for fastening a reel to a shaft rotatable on a particular axis, comprising:

first means having a first position decoupling the reel radially from the shaft and movable to a second position for coupling the reel to the shaft independently from the rotation of the shaft, and second means including mounting means on the shaft for receiving the reel, and being movable on the particular axis upon the receipt of the reel on the mounting means for obtaining a movement of said first means from the first position to the second position and from the second position to the first position when a force for removing the reel from the mounting means is applied to the reel.

4. In combination, for fastening a reel, a shaft rotatable on a particular axis:

first mounting means fixed to the shaft, second mounting means on said first mounting means for receiving the reel, means on the second mounting means normally having a first operative relationship for decoupling the reel from the shaft and movable, in a direction transverse to the particular axis to a second operative relationship of interaction with the reel for releasably locking the reel to the shaft independently from any rotation of the shaft means operatively coupled to the second mounting means for moving the second mounting means relative to the first mounting means from the first operative relationshp to the second operative relationship upon the receipt of the reel by the second mounting means.

5. In combination for fastening a reel to a rotatable shaft, comprising:

mounting means on the shaft for receiving the reel, means normally having a first operative relationship for decoupling the reel from the shaft and reversibly movable to a second operative relationship for locking the reel to the shaft independently from the rotation of the shaft, and means operatively coupled to the mounting means for obtaining a movement of the last mentioned means to the second operative relationship upon the receipt of the reel by the mounting means.

6. A reel holder adapted for fastening a reel on a rotatable shaft comprising, in combination:

means for engaging a reel, and radially interacting with the reel for axially reversibly locking said reel in random index concentric relationship to said shaft independent from rotation thereof; and means for actuating said locking means for obtaining locking and unlocking in response to axial movement of said reel respectively in one and the opposite axial direction.

7. In combination for fastening a reel to a shaft, comprising:

a hub member having a flange having dimensions to engage the reel when said reel is axially slid in a first direction onto said hub member;

means for mounting said hub member on a shaft permitting axial movement of said hub member between first and second positions;

a resilient ring circumferentially positioned on said hub member, and having a diameter when said hub member is in said first position to receive the reel when slid onto said hub member;

a plurality of radially movable elements in said hub member engaging said ring for spreading said ring in axial direction; and linking means for coupling said shaft to said elements to move said elements radially outwardly upon axial movement of said hub member, from said first position toward said second position, said ring when spread, thereby being compressed and engaging said reel causing reaction in that said movable elements and linking means urge said hub member in said first direction to be retained in said second position.

8. In combination for fastening a reel, a shaft rotatable upon a particular axis, mounting means on the shaft for receiving the reel by motion of the reel relative to the mounting means in a first direction and for moving along the particular axis in accordance with the force exerted by the reel against the mounting means in said direction, means for limiting the motion of the mounting means in said first direction, means disposed on the shaft and movable with the mounting means along the particular axis and displaceable radially in accordance with such axial movement, and means disposed on the shaft and responsive to the radial displacement of the last mentioned means during the axial movement of such last mentioned means for locking the reel by clamping the reel to the mounting means and urging the mounting means towards the limiting means in said first direction to obtain a rotation of the reel with the shaft.

9. A reel holder adapted for fastening a reel on a rotatable shaft comprising, in combination:

means for engaging a reel, and radially interacting with the reel for axially reversibly locking said reel in random index concentric relationship to said shaft independent from rotation thereof; and means for actuating said locking means in response to movement of said reel relative to the shaft.

10. In combination for locking a reel to a rotatable shaft:

a radially expandable hub member axially displaceable on the shaft but rotating therewith;

means for controlling the radial dimensions of the hub member in response to the axial position of the hub member on the shaft, a reel when on the radially expandable hub being clamped thereto and interacting with the hub member by urging the hub member in different axial directions when in different axial positions independently from rotation thereof;

means for limiting the axial displacement of the hub at least in one axial direction and for a position of the hub member in which the interaction of the reel with the hub member continues to urge the hub member in that one axial direction.

11. A combination for locking a reel to a shaft, comprising:

first means axially movably positioned on the shaft for receiving a reel from a first axial direction, the first means having a first position for being decoupled from the reel, and having at least one second position, and at least one third position in which the reel is coupled to the first means resulting in reaction forces between the first means and reel;

second means for coupling the first means to the shaft and establishing the first, second and third positions of the first means in response to different axial positions of the first means relative to the shaft independently from rotation thereof, the reaction force between the reel and the first means tending to move the first means and the reel in a second axial direction opposite to the first direction when the first means is in the second position and tending to move the first means and the reel in the first axial direction when the first means is in the third position; and third means on the shaft for limiting the motion of the first means in the first direction, so that the first means is locked to the third means when having the third position, for locking the reel to the shaft.

12. In combination for fastening a reel having a central opening, to a shaft, comprising:

a hub member including an expandable, circumferentially disposed ring having dimensions to be received in the opening of the reel, the hub member being mounted to the shaft to permit axial movement relative to the shaft within a limited range defined by first and second axial positions;

first means in said hub member, the first means being activatable to extend the effective diameter of the hub member and the ring at predetermined areas from a first, relatively small diameter through a second, maximum diameter to a third diameter smaller than the maximum but larger than the first diameter, said first diameter being selected to slide into the opening of the reel;

second means to retain the reel when slid onto said hub member in one axial direction; and third means in said hub member to actuate said first means for extending the diameter of the hub member from the first to the third diameter when said hub member is axially moved from the first to the second axial position as the reel acts axial on the second means in said one axial direction for locking the reel to the hub in the second axial position.

13. In combination for fastening a reel to a rotatable shaft comprising:

a hub member mounted to said shaft for axial movement thereon and having variable radial dimensions, the hub member following the rotation of the shaft;

means rotating with the shaft and limiting the axial movement of the hub member to within a range defined by first and second axial positions of the hub member relative to the shaft;

actuator means coupled to the shaft and the hub member to vary the radial dimensions of the hub member, the hub member when in the first axial position having radial dimensions for clearingly receiving a reel, the hub member obtaining maximum radial dimensions by the actuator when having a third axial position in between the first and second axial positions, thereby clamping a reel to the hub member and continuing to clamp the reel to the hub member in any axial position in between the second and the third positions thereof;

means on the hub member for engagement with the reel so that upon axial movement of the reel the hub member moves from the first axial position to the second axial position or vice versa, the reel and the hub member interacting when the hub member has any axial position in between the third and second position to urge the hub member towards and into the second position for locking the reel to the shaft.

14. In combination for fastening a reel to a rotatable shaft, comprising:

first means on the shaft for receiving a reel and being axially movable relative to the shaft;

second means responsive to the axial position of the first means to provide a first operative relationship in at least a first axial position of the first means in which the reel is removable in a first axial direction from the first means, and providing a second operative relationship in at least a second axial position of the first means in which the reel is clamped to the first means and the reel urges the first means axially in a second direction opposite to the first direction, the first and second operative relationships being independent from the rotation of the shaft;

third means for limiting the axial movement of the first means in said second direction to the second position; and fourth means responsive to the movement of a reel on the first means in the second direction to follow the movement thereof from the first to the second position to thereby change the second means from the first to the second operative relationship.

References Cited

UNITED STATES PATENTS

| | | | |
|---|---|---|---|
| 799,435 | 9/1905 | Baker | 242—72 |
| 2,075,192 | 3/1937 | George | 242—72 |
| 3,124,319 | 3/1964 | Cohen et al. | 242—68.3 |

FRANK J. COHEN, *Primary Examiner.*